United States Patent
Fichtner et al.

(10) Patent No.: US 8,084,386 B2
(45) Date of Patent: Dec. 27, 2011

(54) METHOD FOR PRODUCING A HYDROGEN STORAGE MATERIAL

(75) Inventors: Maximilian Fichtner, Oftersheim (DE); Christoph Frommen, Stutensee (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 633 days.

(21) Appl. No.: 12/063,496

(22) PCT Filed: Jul. 27, 2006

(86) PCT No.: PCT/EP2006/007431
§ 371 (c)(1),
(2), (4) Date: Feb. 11, 2008

(87) PCT Pub. No.: WO2007/017129
PCT Pub. Date: Feb. 15, 2007

(65) Prior Publication Data
US 2010/0167917 A1    Jul. 1, 2010

(30) Foreign Application Priority Data
Aug. 10, 2005    (DE) .................. 10 2005 037 772

(51) Int. Cl.
*B01J 31/00* (2006.01)
*B01J 23/00* (2006.01)
*B01J 27/06* (2006.01)
*B01J 27/22* (2006.01)
*B01J 21/02* (2006.01)
*B01J 23/70* (2006.01)
*B01J 27/24* (2006.01)

(52) U.S. Cl. ......... 502/172; 502/300; 502/302; 502/304; 502/224; 502/177; 502/202; 502/355; 502/344; 502/200; 423/644; 423/646

(58) Field of Classification Search .................. 502/172
See application file for complete search history.

(56) References Cited

U.S. PATENT DOCUMENTS
3,387,933 A    6/1968    Snyder
6,106,801 A *  8/2000    Bogdanovic et al. ...... 423/648.1
(Continued)

FOREIGN PATENT DOCUMENTS
DE    19526434    1/1997
(Continued)

OTHER PUBLICATIONS
B. Bogdanovic et al., "Ti-doped alkali metal aluminium hydrides as potential novel reversible hydrogen storage materials", Journal of Alloys and Compounds 253-254, 1997, pp. 1-9.
(Continued)

*Primary Examiner* — Melvin Mayes
*Assistant Examiner* — Bijay Saha
(74) *Attorney, Agent, or Firm* — Leydig, Voit & Mayer, Ltd.

(57) ABSTRACT

Method for producing a hydrogen storage material that includes a metal hydride and a non-hydrogenated material and that is doped with a metal as a catalyst, includes; mixing a catalyst precursor, which includes the metal, with the non-hydrogenated material so as to provide a first mixture; agitating the first mixture; thermally treating the first mixture so as to form a composite of the non-hydrogenated material and the metal; mixing the composite with the metal hydride so as to provide a second mixture; and grinding the second mixture so as to provide the hydrogen storage material.

12 Claims, 1 Drawing Sheet

U.S. PATENT DOCUMENTS

| | | | |
|---|---|---|---|
| 6,471,935 | B2 | 10/2002 | Jensen et al. |
| 6,814,782 | B2 | 11/2004 | Bogdanovic et al. |
| 2003/0143154 | A1* | 7/2003 | Gross et al. ............ 423/644 |
| 2003/0165423 | A1 | 9/2003 | Gross et al. |
| 2004/0009121 | A1 | 1/2004 | Jensen et al. |
| 2004/0247521 | A1 | 12/2004 | Bogdanovic et al. |
| 2006/0191372 | A1* | 8/2006 | Haidar ............ 75/10.21 |
| 2006/0264324 | A1 | 11/2006 | Schuth et al. |

FOREIGN PATENT DOCUMENTS

| | | |
|---|---|---|
| DE | 10012794 | 9/2001 |
| DE | 10163697 | 7/2003 |
| DE | 10332438 | 4/2005 |

OTHER PUBLICATIONS

D. L. Anton, "Hydrogen desorption kinetics in transition metal modified NaAlH4", Journal of Alloys and Compounds 356-357, 2003, pp. 400-404.

E H. Majzoub et al., "Titanium-halide catalyst-precursors in sodium aluminium hydrides", Journal of Alloys and Compounds 356-357, 2003, pp. 363-364.

P. Wang et al, "Method of preparing Ti-doped NaAlH4 using Ti Powder: observation of an unusual reversible dehydrogenation behavior", Journal of Alloys and Compounds 379, 2004, pp. 99-102.

J. Wang et al., "Synergistic effects of co-dopants on the dehydrogenation kinetics of sodium aluminium hydride", Journal of Alloys and Compounds 391, 2005, pp. 245-255.

\* cited by examiner

METHOD FOR PRODUCING A HYDROGEN STORAGE MATERIAL

CROSS REFERENCE TO RELATED APPLICATIONS

This is a U.S. national phase application under 35 U.S.C. §371 of International Patent Application No. PCT/EP2006/007431, filed Jul. 27, 2006, and claims benefit of German Patent Application No. 10 2005 037 772.6, filed Aug. 10, 2005. The Internation Application was published in German on Feb. 15, 2007 as WO 2007/017129 A2 under PCT Article 21(2).

FIELD

The present invention relates to a method for producing a hydrogen storage material which contains a metal hydride and a non-hydrogenated material and which is doped with a metal as a catalyst.

BACKGROUND

The German Patent Application DE 195 26 434 A1 describes a method for reversibly storing hydrogen which provides for using sodium alanate, potassium alanate, sodium-lithium alanate, sodium-potassium alanate or lithium-potassium alanate as reversible hydrogen storage materials.

Using natrium alanate $NaAlH_4$ as an example, it describes reversibly storing hydrogen in accordance with the following multi-stage procedure:

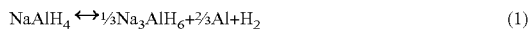

$$NaAlH_4 \leftrightarrow \tfrac{1}{3}Na_3AlH_6 + \tfrac{2}{3}Al + H_2 \quad (1)$$

$$\tfrac{1}{3}Na_3AlH_6 \leftrightarrow NaH + \tfrac{1}{3}Al + \tfrac{1}{2}H_2 \quad (2)$$

$$NaH \leftrightarrow Na + \tfrac{1}{2}H_2 \quad (3)$$

In this context, the hydrogen exchange of the stages is performed in accordance with equations (1) and (2) at temperatures of around 100° C. and pressures of several MPa, which is especially significant for low-temperature fuel cells. Of the altogether 7.6% by weight of H in the compound $NaAlH_4$, 5.6% by weight of H can be theoretically exchanged in accordance with equations (1) and (2). However, if the assumption is that pure $NaAlH_4$ is used, the reaction times last several days, since kinetic barriers delay the conversion of the material.

Therefore, in accordance with the German Patent Application DE 195 26 434 A1, the addition of a catalytically active dopant, typically in quantities of 0.2 to 10 mole % relative to the alkali metal alanate, is a precondition for moderate operating pressures and temperatures. Advantageously suited for this are compounds of transition metals from the 3rd to 5th group of the periodic system (Sc, Y, Ti, Zr, Hf, V, Nb, Ta) of iron, nickel or of a rare earth metal, preferably alcoholates, halogenides, hydrides, organometallic or intermetallic compounds.

The German Patent Application DE 101 63 697 A1 describes hydrogen storage materials made of the above-mentioned alanates or of mixtures of aluminum metal with alkali metals and/or alkali metal hydrides, which are doped with metal catalysts having particle sizes of 0.5 to 1,000 nm and specific surface areas of 50 to 1,000 m²/g, for which transition metals of groups 3 through 11 of the periodic system or aluminum, as well as alloys, mixtures or compounds of these metals, in particular titanium, titanium-iron and titanium-aluminum are used.

B. Bogdanovic, M. Schwickardi, Journal of Alloys and Compounds 253-254 (1997), p. 1, and D. L. Anton, Journal of Alloys and Compounds 356-357 (2003) pp. 400-404, ascertained that, as a dopant, titanium has the best properties in terms of an acceleration of the hydrogen exchange reaction. J. Wang, A. D. Ebner, R. Zidan, J. A. Ritter, Journal of Alloys and Compounds 391 (2005) pp. 245-255, likewise demonstrated that a doping process employing a mixture of different transition metals, in particular Ti with Zr, Fe or a mixture therefrom, is advantageous.

At the present time, a wet impregnation process is used as a doping process in which solvent is added under agitation of a transition metal compound, or a solventless doping process is used in accordance with U.S. Pat. No. 6,471,935 which provides for the hydrogen carrier material to be mechanically alloyed with the transition metal compound in a ball mill. In both cases, the higher-valency transition metal chemically reacts with the alanate to form the reduced metal. Depending on the type and added quantity of catalyst precursor, a certain amount of metal hydride is consumed during the course of the reaction (oxidized). Besides finely dispersed and catalytically active $Ti^0$, either gaseous organic by-products are produced that can damage the fuel cell, or, as expressed by the equation

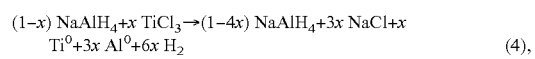

$$(1-x)\,NaAlH_4 + x\,TiCl_3 \rightarrow (1-4x)\,NaAlH_4 + 3x\,NaCl + x\,Ti^0 + 3x\,Al^0 + 6x\,H_2 \quad (4),$$

solids, such as $Al^0$ and NaCl, form, which do not store any hydrogen and, therefore, degrade the gravimetric storage capacity of the material.

E. H. Majzoub and K. J. Gross, Journal of Alloys and Compounds (2003), 356-357, p. 363 and P. Wang and C. M. Jensen, Journal of Alloys and Compounds (2004), 379, pp. 99-102 attempted to overcome this disadvantage by dispensing with expensive $TiCl_3$ and by using finely dispersed metallic Ti or a cubic $TiAl_3$ alloy instead as dopant for $NaAlH_4$. However, the production required very long ball milling times and, at a charging time of 12 h, for example, a working temperature of 120° C., and an $H_2$ charging pressure of 12 Mpa, the material produced in this manner exhibited only very slow kinetics.

Since high costs are entailed in the chemical production of alanate, the German Patent Application DE 100 12 794 A1 describes producing the alanate by performing the reverse reaction, as expressed by equations (2) and (1), i.e., using inexpensive starting materials, such as NaH and Al, as well as transition metal catalysts or rare earth metal catalysts as dopants. However, if $TiCl_3$ is used as a precursor for the catalyst at a price of approximately 15-20 euro/g, this leads to catalyst costs of around 50,000 euro for 100 kg of storage material, which considerably limits commercial use.

It would be more economical and practical to use the far less expensive $TiCl_4$ at a price of approximately 0.02 euro/g. The price for an equivalent Ti quantity would only amount to around 50 euro for 100 kg of storage material. However, this compound is tetravalent and only contains about 25% by weight of Ti; the remainder is inactive chloride, so the result is a lower gravimetric storage capacity of the material.

When a metal hydride is doped with a multivalent Ti compound such as $TiCl_4$, a portion of the hydrogen storage material is consumed, metallic $Ti^0$ forming as the result of a redox reaction. In the process, besides metallic $Al^0$, which does not store any hydrogen, other secondary products having inactive storage capacity are formed, such as NaCl in particular, as expressed by equation (4).

Also, when the storage material is produced by performing the reverse reaction of equation (2), material having inactive storage capacity is formed after adding the catalyst Ti precursor as expressed by

$$4NaH + TiCl_4 \rightarrow 4NaCl + Ti + 2H_2 \quad (5).$$

TABLE 1

Theoretical proportion of material having inactive storage capacity when Ti, TiCl$_3$ and TiCl$_4$ are used as catalyst precursor

| Production method in accordance with the equation | Precursor [2 mole %] | Proportion of material having inactive storage capability |
|---|---|---|
| (4) NaAlH$_4$ + precursor | TiCl$_3$ | 11.3% by weight |
| (4) NaAlH$_4$ + precursor | TiCl$_4$ | 14.4% by weight |
| (5) NaH + Al + precursor | TiCl$_3$ | 8.8% by weight |
| (5) NaH + Al + precursor | TiCl$_4$ | 11.1% by weight |
| — NaH + Al + Ti | — | 1.9% by weight |

According to Table 1, when TiCl$_3$ or TiCl$_4$ is used as a catalyst precursor, respectively metallic Ti, as the case may be at a concentration of 2 mole %, the theoretical proportion of material having inactive storage capacity is between 1.9 and 14.4% by weight, depending on the preparation method. Thus, the quantity of inactive storage material produced by using inexpensive TiCl$_4$ would be approximately 6-8 times that produced using metallic Ti, which yields by far the smallest proportion of substances having inactive storage capacity. However, as already described above, due to the long ball milling times during production and the slow kinetics of the product, a use of metallic Ti powder is not beneficial.

SUMMARY

In an embodiment, the present invention provides a method for producing a hydrogen storage material that includes a metal hydride and a non-hydrogenated material and that is doped with a metal as a catalyst. The method includes: mixing a catalyst precursor, which includes the metal, with the non-hydrogenated material so as to provide a first mixture; agitating the first mixture; thermally treating the first mixture so as to form a composite of the non-hydrogenated material and the metal; mixing the composite with the metal hydride so as to provide a second mixture; and grinding the second mixture so as to provide the hydrogen storage material.

BRIEF DESCRIPTION OF THE DRAWINGS

Aspects of the present invention will now be described by way of exemplary embodiments with reference to the following drawings, in which.

DETAILED DESCRIPTION

Figure 1:
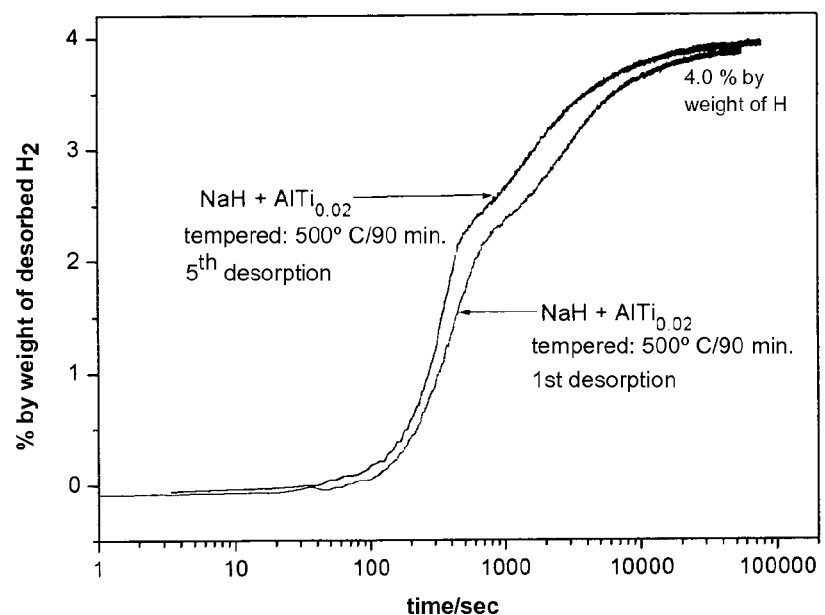
FIG. 1 shows the desorption behavior of a hydrogen storage material produced in accordance with an exemplary embodiment of the present invention.

It is an aspect of the present invention to provide a method for producing hydrogen storage materials to address the aforementioned disadvantages and limitations. In particular, a method is to be provided that will make it possible for a hydrogen storage material to be produced that has a small proportion of substances having inactive storage capacity and, at the same time, that exhibits fast kinetics. In it intended that such a method be able to draw on an economical catalyst precursor and feature the short durations.

A method according to an exemplary embodiment of the present invention for producing a hydrogen storage material that is made of at least one metal hydride and at least one non-hydrogenated material and that is doped with one catalytically active metal as a catalyst, includes the following steps a) through c) that are explained in detail.

A catalyst precursor, typically in the form of a powder, is first prepared. It contains the metal that is used as catalytically active dopant for the hydrogen storage material to be produced. As metal, a transition metal from groups 3, 4, 5, 6, 7, 8, 9, 10 and 11 of the periodic system, or a rare earth metal is suited, titanium, zirconium, iron, cobalt, nickel or cerium, as well as a mixture or alloy containing at least two of these metals being preferred. The catalyst precursor itself constitutes a metal compound that is preferably present in the form of a hydride, carbide, nitride, oxide, alcoholate or halogenide, in particular of a chloride.

At this point, in accordance with step a), the prepared metal compound, as a catalyst precursor, is intimately mixed with the non-hydrogenated material of the hydrogen storage material that is likewise typically present as powder, and preferably with an organic solvent, such as tetrahydrofuran or diethyl ether, and preferably agitated for several hours. An element of the 3rd main group of the periodic system, such as boron or aluminum, is preferably used as non-hydrogenated material of the hydrogen storage material, aluminum being preferred.

The mixing and subsequent agitation of this mixture already partially reduces the metal contained in the catalyst precursor. From the catalyst precursor, an intermediate product is generally formed that is non-volatile and, therefore, does not separate itself therefrom prior to the thermal treatment.

In subsequent step b), this mixture undergoes a thermal treatment that is preferably carried out at a temperature of between 250° C. and 900° C., more preferably between 350° C. and 600° C., and, in particular, between 450° C. and 550° C., however, always below the melting point of the non-hydrogenated material. This brings about a thermally induced solid-state reaction between the metal contained in the catalyst precursor and the non-hydrogenated material, thereby producing intermetallic phases when the non-hydrogenated material is a metal. Thus, the catalyst precursor, respectively the non-volatile intermediate product formed therefrom, decomposes, and the liberated metal, together with the non-hydrogenated material, forms a catalytically active composite.

In a subsequent step c), the composite produced in this manner is mixed with a metal hydride that is suited for the hydrogen storage material, and the thus obtained mixture is preferably ground for a few hours in a ball mill. As a metal hydride, alkalimetal hydrides, such as NaH, KH, LiH or a mixture thereof, are preferably suited. Following a time period of approximately 1-3 hours, the finish-processed hydrogen storage material may be removed from the ball mill.

The hydrogen storage material that is produced in accordance with the exemplary embodiment of the present invention is doped with catalytically active metal and that, in accordance with step a) and b), is made of pretreated non-hydrogenated material, such as aluminum powder, itself constitutes a nanocomposite that is capable of being charged with hydrogen (in the case of NaH and aluminum powder, forming NaAlH$_4$) and again discharged thereof. By altering the initial quantities of metal hydride and pretreated non-hydrogenated material (composite), different storage quantities, as well as charging and discharging kinetics may be obtained.

The method according to the exemplary embodiment of the present invention is based on the discovery that, in a process that is carried out by performing the reverse reactions of equations (2) and (1), the chloride is able to be removed virtually completely when the Al powder is mixed with low-cost $TiCl_4$ and brought to reaction, and the reaction product is then thermally treated in the inert gas stream between 350° C. and 600° C. A finely dispersed, catalytically active titanium phase is formed in this manner. The simultaneously produced chlorine gas is able to be neutralized at the furnace outlet using a potassium hydroxide solution, for example.

Thus, the method according to the exemplary embodiment of the present invention makes it possible for inexpensive $TiCl_4$ to be used as a catalyst precursor for producing a hydrogen storage material on the basis of NaH and Al, whose charging and discharging kinetics corresponds to that of a hydrogen storage material produced using the far more costly $TiCl_3$. In spite of the higher chlorine content in $TiCl_4$ in comparison to $TiCl_3$, the hydrogen storage material still contains merely a small fraction of the chlorine from the catalyst precursor, i.e., a smaller proportion of substances having inactive storage capacity.

According to an exemplary embodiment of the present invention in which a hydrogen storage material was produced, 3.79 g of $TiCl_4$ (0.02 mole) were added to a suspension of 27 g of Al powder (1 mole, 325 mesh number, purity 99.8%) in 200 ml of THF and agitated for several hours under inert conditions. A turquoise-blue coloration resulted in the process, indicating a partial reduction of the titanium.

To begin with, this pretreatment of the Al powder in the liquid phase produces the trivalent titanium compound $TiCl_3$. (THF) by partial reduction. In contrast to $TiCl_4$, which has a boiling point of Kp=136° C., it is non-volatile, and, upon removal of the solvent, it covers the surface of the aluminum particles as a thin film.

The grey-green residual product was then thermally treated in the inert gas stream at approximately 500° C. for 90 minutes. In the process, the residual product took on a dark grey coloration. A concentration of 1.9±0.1 mole % titanium and 1.0±0.1 mole % chlorine in the composite was obtained from the elementary analysis. The thermal treatment in the inert gas stream causes a breakdown of the material and induces chemical reactions with the aluminum, thereby also producing catalytically active, intermetallic titanium-aluminum phases.

1.034 g of the composite material were ball-milled with 0.888 g of NaH for a period of 120 minutes under argon atmosphere (planetary-type ball mill, 600 rpm, Si nitride jar and grinding pellets, B/P ratio 20:1).

Using 2 g of the resultant material, hydrogen charging and discharging cycles were carried out in a Sievert apparatus. FIG. 1 illustrates the desorption behavior of a hydrogen storage material produced in accordance with this exemplary embodiment that had undergone tempering for 90 minutes at 500° C., in the case of the first desorption (right curve) and the fifth desorption (left curve). It turns out that an improvement in the conversion kinetics is obtained when the material undergoes several cycles. The charging of the hydrogen was carried out at 100° C. and a total pressure of 10 MPa $H_2$; the discharging took place at a temperature of 150° C. and a total pressure of 0.04 MPa $H_2$. The charging and discharging kinetics corresponds approximately to that of a hydrogen storage material that had been produced using the far more costly $TiCl_3$. By varying the initial quantities of NaH (+y MH, y being=0-1, M=metal) and $AlTi_x$, different storage quantities and charging and discharging kinetics may be provided.

Figure 2:
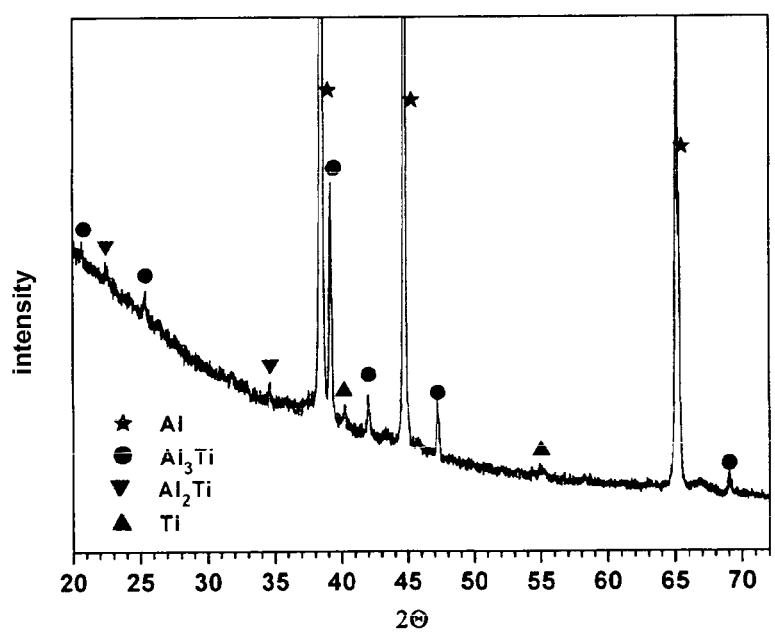
FIG. 2 illustrates an X-ray powder diffractogram of an AlTi$_{0.02}$ composite produced using the method according to an exemplary embodiment of the present invention.

FIG. 2 shows an X-ray powder diffractogram of an $AlTi_{0.02}$ composite material produced in accordance with the present invention. The symbols denote each of the elements or compounds from where the signals characterizing the same originate. This result may also be regarded as being indicative of the production of metallic Ti, as well as of $Al_3Ti$ and $Al_2Ti$, the proportions of the newly formed crystalline phases varying depending on temperature and treatment duration.

From the likewise obtained REM/EDX images of the elemental distribution of Al and Ti in the micrograph of an Al—Ti composite ($AlTi_{0.02}$) treated for 90 minutes at 500° C., it is discernible that the Al particles pretreated in this manner are surrounded by a titanium-containing film that merely still contains up to approximately 1/10 of the chlorine from the catalyst precursor.

The invention claimed is:

1. A method for producing a hydrogen storage material that includes a metal hydride and a non-hydrogenated material and that is doped with a metal as a catalyst, comprising:
   a) mixing a catalyst precursor, which includes the metal, with the non-hydrogenated material and an organic solvent so as to provide a first mixture;
   b) agitating the first mixture;
   c) thermally treating the first mixture so as to form a composite of the non-hydrogenated material and the metal;
   d) mixing the composite with the metal hydride so as to provide a second mixture; and
   e) grinding the second mixture so as to provide the hydrogen storage material.

2. The method as recited in claim 1, wherein the metal of the catalyst precursor includes at least one of a rare earth metal and a transition metal from the group 3 through 11 of the periodic system.

3. The method as recited in claim 2, wherein the metal of the catalyst precursor includes at least one of titanium, zirconium, iron, cobalt, nickel, cerium, a mixture thereof and an alloy thereof.

4. The method as recited in claim 1, wherein the catalyst precursor is present in the form of at least one of a halogenide, a hydride, a carbide, a nitride, oxide and an alcoholate.

5. The method as recited in claim 4, wherein the catalyst precursor is present in the form of a chloride.

6. The method as recited in claim 1, wherein the non-hydrogenated material of the hydrogen storage material includes an element of the 3rd main group of the periodic system.

7. The method as recited in claim 6, wherein the non-hydrogenated material of the hydrogen storage material includes at least one of aluminum and boron.

8. The method as recited in claim 1, wherein the metal hydride includes at least one of LiH, NaH, KH and a mixture thereof.

9. The method as recited in claim 1, wherein the organic solvent includes at least one of tetrahydrofuran and diethyl ether.

10. The method as recited in claim 1, wherein the thermally treating the first mixture is carried out below the melting point of the non-hydrogenated material and at a temperature of between 250° C. and 900° C.

11. The method as recited in claim 10, wherein the thermally treating the mixture is carried out at a temperature of between 350° C. and 600° C.

12. The method as recited in claim 1, wherein the catalyst precursor is in the form of a chloride, the metal of the catalyst precursor is titanium, the non-hydrogenated material includes aluminum and the organic solvent includes tetrahydrofuran.

* * * * *